United States Patent
Reijonen et al.

(10) Patent No.: US 8,578,492 B2
(45) Date of Patent: Nov. 5, 2013

(54) APPLICATION REVOCATION

(75) Inventors: Antti Reijonen, Helsinki (FI); Marko Rapeli, Espoo (FI); Jarno Rautakorpi, Helsinki (FI)

(73) Assignee: F-Secure Corporation, Helsinki (FI)

( * ) Notice: Subject to any disclaimer, the term of this patent is extended or adjusted under 35 U.S.C. 154(b) by 215 days.

(21) Appl. No.: 13/068,754

(22) Filed: May 19, 2011

(65) Prior Publication Data

US 2012/0297480 A1  Nov. 22, 2012

(51) Int. Cl.
*G06F 12/14* (2006.01)

(52) U.S. Cl.
USPC ............................................................ 726/23

(58) Field of Classification Search
None
See application file for complete search history.

(56) References Cited

U.S. PATENT DOCUMENTS

| | | | |
|---|---|---|---|
| 2006/0281440 A1 | 12/2006 | Minear et al. | 455/410 |
| 2009/0193520 A1* | 7/2009 | Buss | 726/21 |
| 2009/0217258 A1 | 8/2009 | Wenzinger et al. | 717/173 |
| 2010/0005291 A1 | 1/2010 | Hulten et al. | 713/156 |
| 2010/0169979 A1 | 7/2010 | Brown et al. | 726/26 |
| 2010/0262959 A1 | 10/2010 | Bruno et al. | 717/171 |
| 2011/0047620 A1 | 2/2011 | Mahaffey et al. | 726/23 |

* cited by examiner

*Primary Examiner* — Brandon Hoffman
(74) *Attorney, Agent, or Firm* — Harrington & Smith

(57) ABSTRACT

In accordance with an example embodiment of the present invention, there is provided apparatus, including: at least one processor; and at least one memory including executable instructions, the at least one memory and the executable instructions being configured to, in cooperation with the at least one processor, cause the apparatus to perform at least the following: receiving an application revocation request; confirming whether initiating an application revocation process is allowed; generating application revocation data once initiating the application revocation process has been allowed; storing the generated application revocation data to a reputation service network; and provide one or more revocation clients the generated application revocation data from the reputation service network in order to enable the one or more revocation clients revoking the application.

17 Claims, 3 Drawing Sheets

APPLICATION REVOCATION

TECHNICAL FIELD

The exemplary and non-limiting embodiments of the present application relate generally to methods, apparatuses and computer programs and, more specifically, to application revocation in communication systems.

BACKGROUND

This section provides context to the invention recited in the claims. This description of background art may include insights, discoveries, understandings or disclosures, or associations together with disclosures that are introduced to the relevant field by the present invention. Some of such contributions of the invention may be specifically pointed out below, whereas other such contributions of the invention are apparent from their context.

Offering various applications to mobile users has recently become popular. For example, it is increasingly common to use network operator portals to find free mobile games and other applications. Mobile network operators are also involved in an ongoing effort to develop their own application stores for their subscribers. Application developers can propose and publish applications on these stores and may be rewarded with a revenue sharing of the selling prices.

There are also security issues related to offering of these applications. In the mobile market, mobile operators are more likely to accept new devices into their portfolio, which can include different application stores, if they or device manufacturers have an option to revoke an application if, for example, it causes problems to the network.

SUMMARY

The following presents a simplified summary of the invention and provides a basic understanding of some aspects of the invention. The summary is not an extensive overview of the invention, and does not identify key elements of the invention or specify the scope of the invention. Its sole purpose is to present some concepts of the invention in a simplified form as an introduction to the more detailed description that is presented later.

The claims describe various aspects of the invention.

According to one aspect of the present invention, there is provided a method comprising: receiving an application revocation request; confirming whether initiating an application revocation process is allowed; generating application revocation data once initiating the application revocation process has been allowed; storing the generated application revocation data to a reputation service network; and providing one or more revocation clients the generated application revocation data from the reputation service network in order to enable the one or more revocation clients revoking the application.

According to a second aspect of the present invention, at least one processor; and at least one memory including executable instructions, the at least one memory and the executable instructions being configured to, in cooperation with the at least one processor, cause the apparatus to perform at least the following: receiving an application revocation request; confirming whether initiating an application revocation process is allowed; generating application revocation data once initiating the application revocation process has been allowed; storing the generated application revocation data to a reputation service network; and provide one or more revocation clients the generated application revocation data from the reputation service network in order to enable the one or more revocation clients revoking the application.

According to a third aspect of the present invention, computer program product comprising a computer-readable medium bearing computer program code embodied therein for use with a computer, the computer program code comprising: code for receiving an application revocation request; code for confirming whether initiating an application revocation process is allowed; code for generating application revocation data once initiating the application revocation process has been allowed; code for storing the generated application revocation data to a reputation service network; and code for providing one or more revocation clients the generated application revocation data from the reputation service network in order to enable the one or more revocation clients revoking the application.

All combinations of the various aspects, embodiments and features of the invention are possible and within the scope of the present invention as claimed.

BRIEF DESCRIPTION OF THE DRAWINGS

The accompanying drawings provide a more complete understanding of the embodiments of the present invention according to the following descriptions.

DETAILED DESCRIPTION OF THE DRAWINGS

Example embodiments of the present invention are later described in more detail with reference to the accompanying drawings, in which some embodiments of the invention are shown. The invention may be embodied in many different forms and should not be construed as limited to the embodiments set forth here. Although the specification may refer to "an", "one", or "some" embodiment in several locations, this does not necessarily mean that each such reference is to the same embodiment, or that the feature only applies to a single embodiment. Single features of different embodiments may also be combined to provide other embodiments.

The present invention can be applied to any terminal, server, corresponding component, and/or to any communication system or combination of different communications systems that support the required functionality. Due to the rapid development of the specifications of computer systems and protocols that are used, all words and expressions should be interpreted broadly; they are intended only to illustrate the embodiment.

Figure 1:
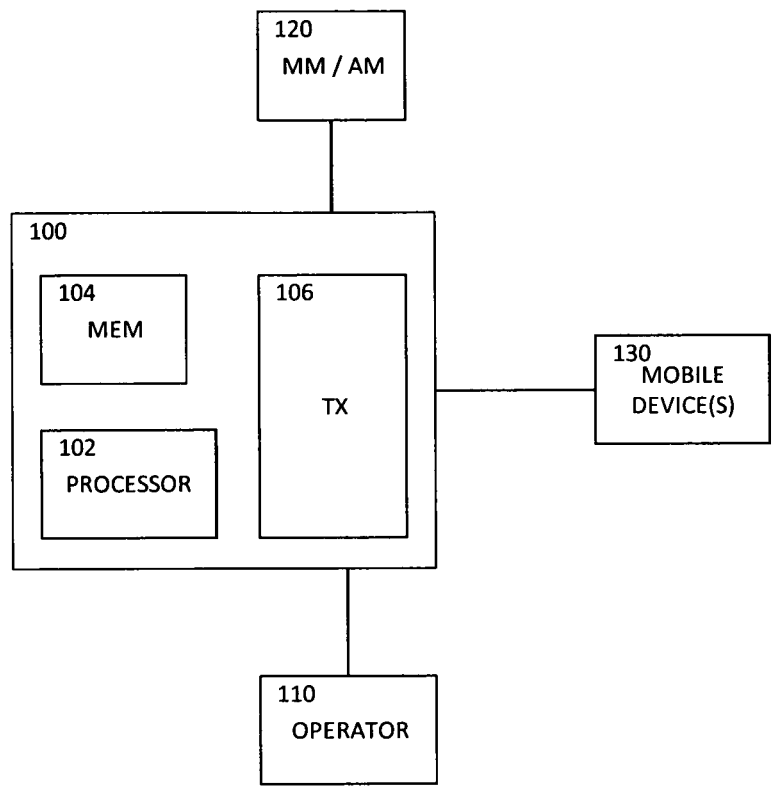
FIG. 1 shows a simplified block diagram that illustrates an example of apparatuses according to the invention.

FIG. 1 illustrates a general example of apparatuses in which the embodiments of the invention may be applied. It only shows the elements and functional entities that are required for understanding the application revocation arrangement according to an embodiment of the invention. Other components have been omitted for the sake of simplicity. The implementation of the elements and functional entities may vary from that shown in FIG. 1. The connections shown in FIG. 1 are logical connections, and the actual physical connections may be different. It is apparent to a person skilled in the art that the arrangement may also comprise other functions and structures.

An example apparatus 100 of FIG. 1 comprises at least one processor 102 and at least one memory 104 including executable instructions. The memory 104 and the executable instructions are configured, in cooperation with the processor 102, to cause the apparatus 100 to perform at least the following: receiving an application revocation request, confirming whether initiating an application revocation process is allowed, generating application revocation data once initiating the application revocation process has been allowed, storing the generated application revocation data to a reputation service network; and providing one or more revocation clients with the generated application revocation data from the reputation service network in order to enable the one or more revocation clients revoking the application.

In an embodiment, the application revocation request may be received from at least one of the following: a mobile operator 110, a mobile device manufacturer 120, an application service provider 120, an application software manufacturer 120 and any other service provider, for example, an application store. Several different reasons may cause the application revocation request to be sent, for example, the application is not functioning properly, the application produces excess data, or the application may be detected to include malware or other harmful elements. For example, it may be detected that a destructive program has masqueraded as a benign application, such as a Trojan, which may be used to steal information or harm the system.

In an embodiment, confirming that the application revocation process is allowed may comprise: requesting approval for initiating the application revocation process from at least one of the following: a mobile device manufacturer, a mobile operator, an application service provider, an application software manufacturer and any other service provider. In another embodiment, there may be predetermined rules that are applied when deciding whether the application revocation process can be started. The decision whether to start application revocation process automatically or to request approval may depend, for example, on the nature of the request, or on the possible severity of the threat that the application may cause, or on both.

In an embodiment, the reputation service network receives a report from one or more revocation clients, for example, from the mobile device 130, whether the application revocation was successful.

In an embodiment, the received application revocation request comprises a sample of the application to be revoked. The sample is analyzed before requesting approval for initiating the application process and confirming whether the application revocation process is allowed.

In an embodiment, file reputation data is created on the basis of the analysis. Once the sample is analyzed, the file reputation data created is entered into the reputation service network.

Figure 2:
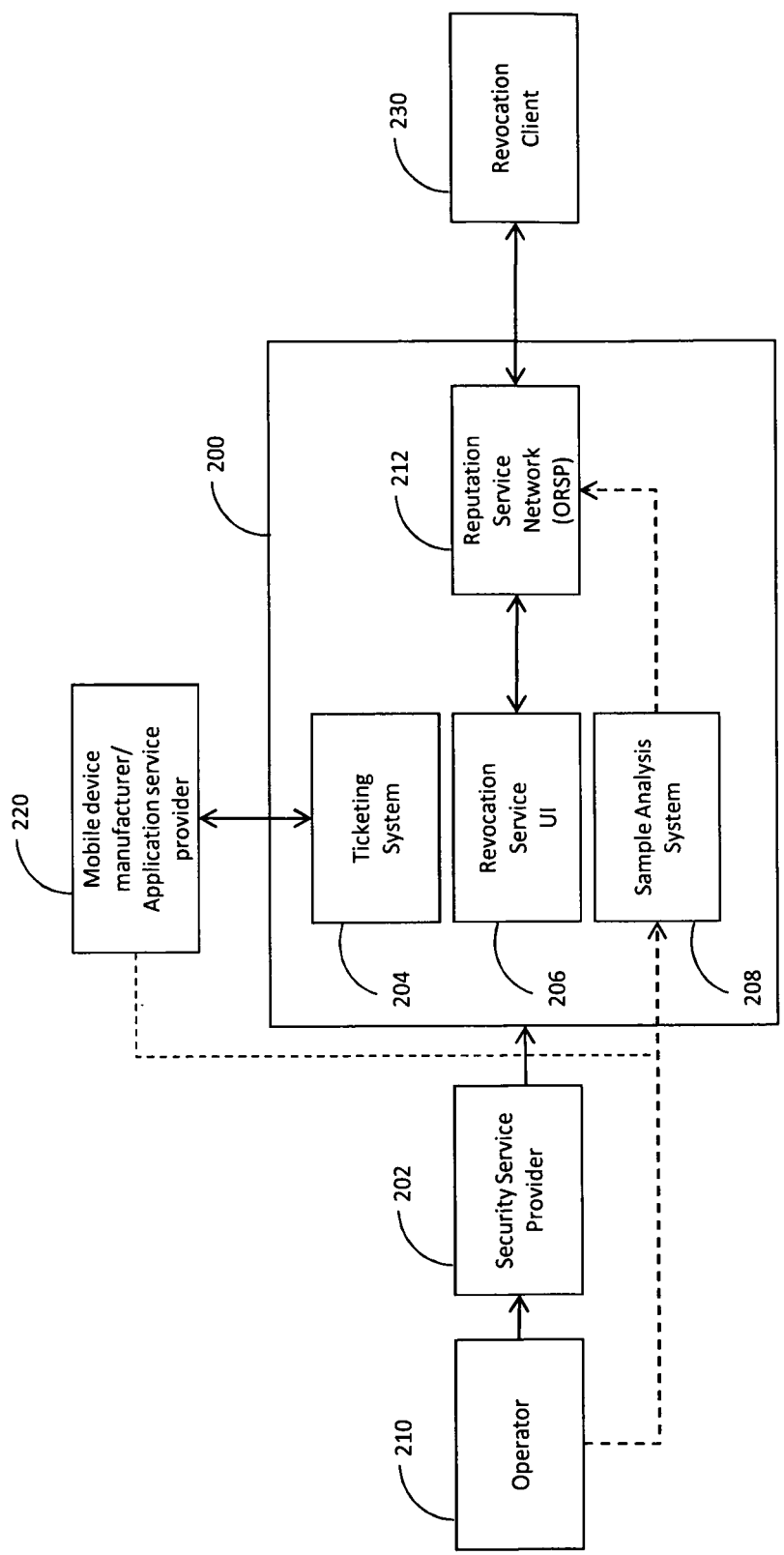
FIG. 2 shows a simplified block diagram of apparatuses and an arrangement according to exemplary embodiments of the invention.

FIG. 2 shows another example of apparatuses and an application revocation engine arrangement 200 according to exemplary embodiments of the invention. In an embodiment, an operator 210 first contacts a security service provider 202 and requests application revocation. For example, a security team of the operator has detected a problematic application that needs to be removed from one or more client terminals and thus, application revocation request is created and sent to the security service provider 202. It is possible that the operator has configured their security software to automatically detect applications that cause security risks or other problems and create and send the application revocation requests whenever such applications (that require revocation) are detected.

In an embodiment, a security service provider 202 receives the application revocation request. It is possible that the application revocation request is first received at the call center of security service providers where it is processed by personnel or by appropriate software, or by both.

In an embodiment, a revocation support request may be created automatically by processes of the security service provider 202 or by support personnel of the security service provider. In an embodiment, the created revocation support request is entered into a support ticketing system 204. An example of such ticketing systems 204 is a Siebel ticketing system.

In an embodiment, for example, a mobile device manufacturer 220 or an application service provider is notified about the new revocation support request. After receiving the notification, the mobile device manufacturer 220 may start internal legal review processes to determine whether to approve the request or not. It is possible that these internal legal reviewing processes are processed at least partly by specific software. After the mobile device manufacturer 220 has processed the revocation support request, it then approves or rejects the revocation support request and sends this decision to the support ticketing system 204.

In an embodiment, the security service provider 202 initiates the application revocation process after receiving an approval for initiating the application revocation process. In an embodiment, the security service provider 202 support personnel may initiate the application revocation process by using a revocation service user interface (RSUI) 206 which passes the information regarding the application revocation to a reputation service network (ORSP) 212, another corresponding reputation system, online reputation server, or data storage facility. These entities may be used to maintain reputation data, different content related to the network (e.g. Internet) or other network traffic, or all of them.

In an embodiment, one or more revocation clients 230, for example, a mobile device, checks every 24 hours (while roaming, for example, only every 48 hours) whether there is any new application revocation data in the ORSP 212. After that, the revocation client or clients 230 may initiate the application revocation or removal, if necessary. In one embodiment, the application revocation may target only a specific part or parts of a whole application, in which case the result of the application revocation process is that only a certain part of the application has been revoked. In another embodiment, the application revocation targets the whole application, in which case the whole application may be removed from the revocation client(s) 230.

In an embodiment, the revocation client 230 reports back to ORSP 212 whether the application revocation succeeded or failed. After the success report has been received in the ORSP 212, a statistical report about the application revocation success may be created into the revocation service user interface 206 for reviewing purposes.

In an embodiment, the operator 210 may provide a sample of an application and/or of any related application data, such as textual description, to be revoked to a sample analysis system 208. Then, the security service provider 202 may analyze the sample, or the application data that is received or both, and generate the application revocation support request to be sent to the mobile device manufacturer 220 as described above. Once an approval has been received from the mobile device manufacturer 220, then the reputation service network 212 may receive the application revocation data and the revocation client 230 may initiate application revocation if necessary. Thus, in an embodiment, the reputation service network 212 may receive file reputation data directly from the sample analysis system 208.

Several advantages can be achieved by using the arrangement according to an embodiment. Problematic applications can be removed from mobile devices. Operators devices are protected and their network is not used for suspicious activities. End users are also protected from losing personal information that is stored on their devices and from exploitation, such as unwanted billing.

The techniques described here may be implemented by various means. An apparatus or system that implements one or more functions described with an embodiment comprises not only existing means, but also means for implementing one or more functions of a corresponding apparatus that is described with an embodiment. An apparatus or system may also comprise separate means for each separate function. These techniques may be implemented in one or more modules of hardware. For software, implementation can be through modules, for example, procedures and functions that perform the functions described here. The software codes may be stored in any suitable data storage medium that is readable by processors or computers or memory units or articles of manufacture and may be executed by one or more processors or computers. The data storage medium or memory unit may be implemented within the processor or computer, or as an external part of the processor or computer, in which case it can be connected to the processor or computer via various means known in the field.

The programming, such as executable code or instructions, electronic data, databases or other digital information can be stored into memories and may include a processor-usable medium. A processor-usable medium may be embodied in any computer program product or article of manufacture which can contain, store, or maintain programming, data or digital information for use by or in connection with an instruction execution system including the processor 102 in the exemplary embodiment.

An embodiment provides a computer program product that comprises a computer-readable medium bearing computer program code embodied therein for use with a computer. The computer program code comprises code for receiving an application revocation request; code for confirming whether initiating an application revocation process is allowed; code for generating application revocation data once initiating the application revocation process has been allowed; code for storing the generated application revocation data to a reputation service network; and code for providing one or more revocation clients the generated application revocation data from the reputation service network in order to enable the one or more revocation clients revoking the application.

Figure 3:
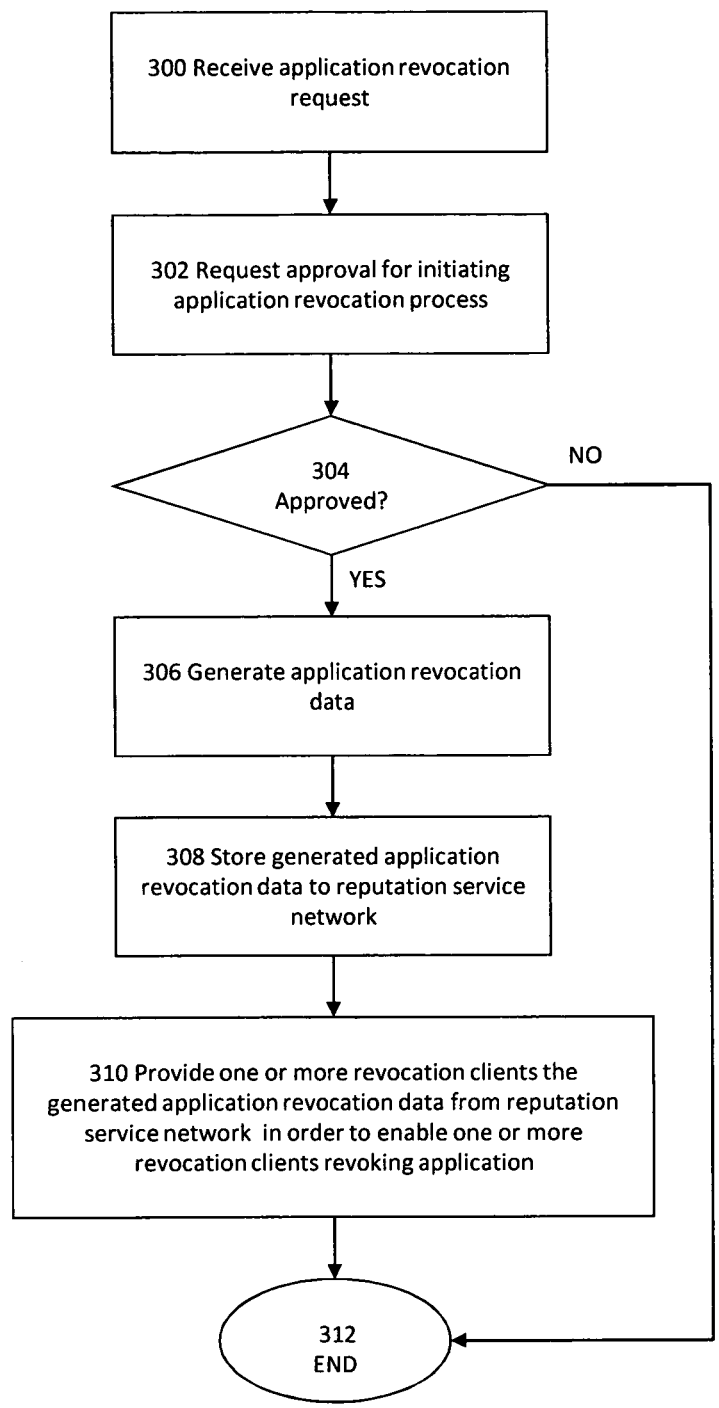
FIG. 3 shows an example of a method of application revocation.

FIG. 3 illustrates an example of a method of application revocation. The method begins in 300 where an application revocation request is received. In 302 and 304, it is confirmed whether initiating an application revocation process is allowed. In this example, an approval for initiating application revocation process is requested in 302. In 304, if the approval for initiating the application revocation process is received, the process then proceeds to 306, otherwise, in case the initiation for the application revocation process is not approved, the process proceed to 312. In 306, application revocation data is generated and in 308, the generated application revocation data is stored to a reputation service network. In 310, the generated application revocation data is provided to one or more revocation clients from the reputation service network in order to enable the one or more revocation clients revoking the application.

The steps, points, signaling messages and related functions described above in relations to FIG. 3 are in no absolute chronological order, and some of the steps may be performed simultaneously or in an order differing from the given one. Other functions may also be executed between the steps or within the steps and other signaling messages sent between the illustrated ones. Some of the steps can also be left out or replaced by a corresponding step. The server functions illustrate a procedure that may be implemented in one or more physical or logical entities.

Embodiments of the present invention may be implemented in software, hardware, application logic or a combination of these. In an example of an embodiment, the application logic, software or a set of instructions is maintained on any conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The various aspects of the invention are not limited to the combinations explicitly set out in the independent claims. Other aspects of the invention may comprise combinations of features from the described embodiments, the dependent claims and the independent claims.

It is obvious to a person skilled in the field that, as the technology advances, the inventive concept can be implemented in various ways. The invention and its embodiments are not limited to the examples described above but may vary within the scope of the claims.

What is claimed is:

1. A method comprising:
   receiving at a security service provider an application revocation request from a first party;
   confirming whether initiating an application revocation process is allowed, by one or more of:
   applying a set of predetermined rules to the application revocation request, and requesting approval from a second party;
   generating application revocation data once initiating the application revocation process has been allowed;
   storing the generated application revocation data to a reputation service network; and
   providing to one or more revocation clients the generated application revocation data from the reputation service network in order to enable the one or more revocation clients revoking the application.

2. A method of claim 1, further comprising confirming the initiation of the application revocation process by requesting approval for initiating the application revocation process; and generating application revocation data for one or more revocation clients once the approval for initiating the application revocation process has been received.

3. A method of claim 2, wherein the approval for initiating the application revocation process is requested from at least one of the following: a mobile device manufacturer, a mobile operator, an application service provider, an application software manufacturer, or any other service provider.

4. A method of claim 1, wherein the application revocation request is received from at least one of the following: a mobile operator, a mobile device manufacturer, an application service provider, an application software manufacturer, or any other service provider.

5. A method of claim 1, further comprising: receiving in the reputation service network a report from the one or more revocation clients whether the application revocation was successful or not.

6. A method of claim 1, wherein the received application revocation request comprises a sample of the application to be revoked and the method further comprises analyzing the sample before initiating the application revocation process.

7. A method of claim 6, further comprising creating file reputation data on the basis of the analysis and entering the created file reputation data into the reputation service network once the sample is analyzed.

8. An apparatus, comprising:
at least one processor; and
at least one memory including executable instructions, the at least one memory and the executable instructions being configured to, in cooperation with the at least one processor, cause the apparatus to perform at least the following:
receiving at a security se vice provider an application revocation request from a first party;
confirming whether initiating an application revocation process is allowed, by one or more of:
applying a set of predetermined rules to the application revocation request, and requesting approval from a second party;
generating application revocation data once initiating the application revocation process has been allowed;
storing the generated application revocation data to a reputation service network; and
provide to one or more revocation clients the generated application revocation data from the reputation service network in order to en a le the one or more revocation clients revoking the application.

9. The apparatus of claim 8, further being configured to request approval for initiating the application revocation process; and to generate application revocation data one or more revocation clients once the approval for initiating the application revocation process has been received.

10. The apparatus bf claim 9, wherein the approval for initiating the application revocation process is requested from at least one of the following: a mobile device manufacture, a mobile operator, an application service provider, an application software manufacturer, or any other service provider.

11. The apparatus of claim 8, wherein the application revocation request is received from at least one of the following: a mobile operator, a mobile device manufacturer, an application service provider, an application software manufacturer, or any other service provider.

12. The apparatus of claim 8, further being configured to receive in the reputation service network a report from the one or more revocation clients whether the application revocation was successful or not.

13. The apparatus f claim 8, wherein the received application revocation on request comprises a sample of the application to be revoked and the apparatus is further configured to analyze the sample before initiating the application revocation process.

14. The apparatus of claim 13, further being configured to create file reputation data on the basis of the analysis and to enter the created file reputation data into the reputation service network once the sample is analyzed.

15. A computer program product comprising a non-transitory computer-readable medium bearing computer program code embodied therein for use with a computer, the computer program code comprising:
code for receiving at a security service provider an application revocation request from a first party;
code for confirming whether initiating an application revocation process is allowed, by one or more of: applying a set of predetermined rules to the application revocation request, and requesting approval from a second party;
code for generating application revocation data once initiating the application revocation process has been allowed;
code for storing the generated application revocation data to a reputation service network; and
code for providing to one or more revocation clients the generated application revocation data from the reputation service network in order to enable the one or more revocation clients revoking the application.

16. The computer program product of claim 15, wherein the received application revocation request comprises a sample of the application to be revoked and the computer program code farther comprises code for analyzing the sample before initiating the application revocation process.

17. The computer program product of claim 16, the computer program code further comprising code for creating file reputation data on the basis of the analysis and entering the created file reputation data into a reputation service network once the sample is analyzed.

* * * * *

UNITED STATES PATENT AND TRADEMARK OFFICE
CERTIFICATE OF CORRECTION

PATENT NO. : 8,578,492 B2
APPLICATION NO. : 13/068754
DATED : November 5, 2013
INVENTOR(S) : Antti Reijonen et al.

It is certified that error appears in the above-identified patent and that said Letters Patent is hereby corrected as shown below:

IN THE CLAIMS:

In Claim 8, Column 7, line 20, delete "se vice" and replace with --service--; and line 33, delete "en a le" and replace with --enable--.

In Claim 9, Column 7, line 37, after "data" insert --for--.

In Claim 10, Column 7, line 40, delete "bf" and replace with --of--; and line 42, delete "manufacture" and replace with --manufacturer--.

In Claim 13, Column 8, line 8, delete "f" and replace with --of--; and line 9, delete "on".

In Claim 16, Column 8, line 39, delete "farther" and replace with --further--.

Signed and Sealed this
Fourth Day of February, 2014

Michelle K. Lee
*Deputy Director of the United States Patent and Trademark Office*